(12) United States Patent
Yeh et al.

(10) Patent No.: US 11,379,679 B2
(45) Date of Patent: *Jul. 5, 2022

(54) INTERACTIVE SYSTEMS AND METHODS WITH TRACKING DEVICES

(71) Applicant: Universal City Studios LLC, Universal City, CA (US)

(72) Inventors: Wei Cheng Yeh, Orlando, FL (US); Travis Jon Cossairt, Celebration, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,304

(22) Filed: Nov. 9, 2020

(65) Prior Publication Data

US 2021/0056273 A1 Feb. 25, 2021

Related U.S. Application Data

(63) Continuation of application No. 16/508,052, filed on Jul. 10, 2019, now Pat. No. 10,839,178, which is a
(Continued)

(51) Int. Cl.
*G06K 7/10* (2006.01)
*G06K 19/07* (2006.01)

(52) U.S. Cl.
CPC ..... *G06K 7/10366* (2013.01); *G06K 7/10158* (2013.01); *G06K 19/0702* (2013.01);
(Continued)

(58) Field of Classification Search
CPC .......... G06K 7/10366; G06K 19/0707; G06K 19/0717; G06K 19/0728; G06K 19/0723;
(Continued)

(56) References Cited

U.S. PATENT DOCUMENTS 5,946,444 A 8/1999 Evans et al.
6,142,368 A 11/2000 Mullins et al.
(Continued)

FOREIGN PATENT DOCUMENTS

DE 102015110784 B3 9/2016
EP 2648463 A2 10/2013
(Continued)

OTHER PUBLICATIONS

European Office Action; EP Application No. 19702743.6; dated Jun. 2, 2021.
(Continued)

*Primary Examiner* — Seung H Lee
(74) *Attorney, Agent, or Firm* — Fletcher Yoder, PC

(57) ABSTRACT

A wearable device includes a radio-frequency identification (RFID) tag having a memory that stores identification information. The wearable device also has a power harvesting circuit configured to harness power from electromagnetic radiation. Further, the wearable device has a sensor coupled to the power harvesting circuit and configured to utilize the power to monitor a condition of the wearable device. Even further, the wearable device has a microcontroller coupled to the sensor and configured to write data indicative of the condition to the memory of the RFID tag, wherein the RFID tag is configured to transmit the identification information and the data in response to receipt of the electromagnetic radiation from an RFID reader.

20 Claims, 5 Drawing Sheets

Related U.S. Application Data continuation of application No. 15/882,761, filed on Jan. 29, 2018, now Pat. No. 10,360,419.

(60) Provisional application No. 62/617,510, filed on Jan. 15, 2018.

(52) U.S. Cl.
CPC ..... *G06K 19/0707* (2013.01); *G06K 19/0709* (2013.01); *G06K 19/0717* (2013.01); *G06K 19/0723* (2013.01); *G06K 19/0728* (2013.01)

(58) Field of Classification Search
CPC ........... G06K 7/10158; G06K 19/0702; G06K 19/0709
See application file for complete search history.

(56) References Cited

U.S. PATENT DOCUMENTS

| | | |
|---|---|---|
| 6,307,952 B1 | 10/2001 | Dietz |
| 6,346,886 B1 | 2/2002 | De La Huerga |
| 6,352,205 B1 | 3/2002 | Mullins et al. |
| 6,474,557 B2 | 11/2002 | Mullins et al. |
| 6,526,158 B1 | 2/2003 | Goldberg |
| 6,634,949 B1 | 10/2003 | Briggs et al. |
| 6,680,707 B2 | 1/2004 | Allen et al. |
| 6,761,637 B2 | 7/2004 | Weston et al. |
| 6,822,569 B1 | 11/2004 | Bellum et al. |
| 6,888,502 B2 | 5/2005 | Beigel et al. |
| 6,908,387 B2 | 6/2005 | Hedrick et al. |
| 6,967,566 B2 | 11/2005 | Weston et al. |
| 7,029,400 B2 | 4/2006 | Briggs |
| 7,047,205 B2 | 5/2006 | Hale et al. |
| 7,066,781 B2 | 6/2006 | Weston |
| 7,204,425 B2 | 4/2007 | Mosher, Jr. et al. |
| 7,224,967 B2 | 5/2007 | Hale et al. |
| 7,311,605 B2 | 12/2007 | Moser |
| 7,327,251 B2 | 2/2008 | Corbett, Jr. |
| 7,336,178 B2 | 2/2008 | Le |
| 7,336,185 B2 | 2/2008 | Turner et al. |
| 7,385,498 B2 | 6/2008 | Dobosz |
| 7,396,281 B2 | 7/2008 | Mendelsohn et al. |
| 7,400,253 B2 | 7/2008 | Cohen |
| 7,445,550 B2 | 11/2008 | Barney et al. |
| 7,479,886 B2 | 1/2009 | Burr |
| 7,488,231 B2 | 2/2009 | Weston |
| 7,492,254 B2 | 2/2009 | Bandy et al. |
| 7,500,917 B2 | 3/2009 | Barney et al. |
| 7,528,729 B2 | 5/2009 | Light et al. |
| 7,541,926 B2 | 6/2009 | Dugan et al. |
| 7,564,360 B2 | 7/2009 | Cote et al. |
| 7,564,426 B2 | 7/2009 | Poor et al. |
| 7,606,540 B2 | 10/2009 | Yoon |
| 7,614,958 B2 | 11/2009 | Weston et al. |
| 7,642,921 B2 | 1/2010 | Cutler et al. |
| 7,674,184 B2 | 3/2010 | Briggs et al. |
| 7,720,718 B2 | 5/2010 | Hale et al. |
| 7,739,925 B2 | 6/2010 | Foster |
| 7,749,089 B1 | 7/2010 | Briggs et al. |
| 7,752,794 B2 | 7/2010 | Kerlin |
| 7,775,894 B2 | 8/2010 | Henry et al. |
| 7,786,871 B2 | 8/2010 | Schwarze et al. |
| 7,791,557 B2 | 9/2010 | Mickle et al. |
| 7,802,724 B1 | 9/2010 | Nohr |
| 7,812,779 B2 | 10/2010 | Turner et al. |
| 7,817,044 B2 | 10/2010 | Posamentier |
| 7,837,567 B2 | 11/2010 | Holzberg et al. |
| 7,850,527 B2 | 12/2010 | Barney et al. |
| 7,855,697 B2 | 12/2010 | Chamarti et al. |
| 7,878,905 B2 | 2/2011 | Weston et al. |
| 7,881,713 B2 | 2/2011 | Hale et al. |
| 7,885,763 B2 | 2/2011 | Havens |
| 7,896,742 B2 | 3/2011 | Weston et al. |
| 7,925,308 B2 | 4/2011 | Greene et al. |
| 7,942,320 B2 | 5/2011 | Joe |
| 7,956,725 B2 | 6/2011 | Smith |
| 7,994,910 B2 | 8/2011 | Brooks et al. |
| 7,997,981 B2 | 8/2011 | Rowe et al. |
| 8,016,667 B2 | 9/2011 | Benbrahim |
| 8,035,335 B2 | 10/2011 | Duron et al. |
| 8,082,165 B2 | 12/2011 | Natsuyama et al. |
| 8,085,130 B2 | 12/2011 | Liu et al. |
| 8,089,458 B2 | 1/2012 | Barney et al. |
| 8,123,613 B2 | 2/2012 | Dabrowski |
| 8,164,567 B1 | 4/2012 | Barney et al. |
| 8,169,406 B2 | 5/2012 | Barney et al. |
| 8,184,097 B1 | 5/2012 | Barney et al. |
| 8,200,515 B2 | 6/2012 | Natsuyama et al. |
| 8,213,862 B2 | 7/2012 | Muth |
| 8,222,996 B2 | 7/2012 | Smith et al. |
| 8,226,493 B2 | 7/2012 | Briggs et al. |
| 8,231,047 B2 | 7/2012 | Canora |
| 8,237,561 B2 | 8/2012 | Beigel et al. |
| 8,248,208 B2 | 8/2012 | Renfro, Jr. |
| 8,248,367 B1 | 8/2012 | Barney et al. |
| 8,253,533 B2 | 8/2012 | Jones |
| 8,253,542 B2 | 8/2012 | Canora et al. |
| 8,296,983 B2 | 10/2012 | Padgett et al. |
| 8,313,381 B2 | 11/2012 | Ackley et al. |
| 8,330,284 B2 | 12/2012 | Weston et al. |
| 8,330,587 B2 | 12/2012 | Kupstas |
| 8,342,929 B2 | 1/2013 | Briggs et al. |
| 8,353,705 B2 | 1/2013 | Dobson et al. |
| 8,368,648 B2 | 2/2013 | Barney et al. |
| 8,373,543 B2 | 2/2013 | Brommer et al. |
| 8,373,659 B2 | 2/2013 | Barney et al. |
| 8,384,668 B2 | 2/2013 | Barney et al. |
| 8,392,506 B2 | 3/2013 | Rowe et al. |
| 8,416,087 B2 | 4/2013 | Canora et al. |
| 8,425,313 B2 | 4/2013 | Nelson et al. |
| 8,430,749 B2 | 4/2013 | Nelson et al. |
| 8,463,183 B2 | 6/2013 | Muth |
| 8,475,275 B2 | 7/2013 | Weston et al. |
| 8,477,046 B2 | 7/2013 | Alonso |
| 8,489,657 B2 | 7/2013 | Shepherd et al. |
| 8,491,389 B2 | 7/2013 | Weston et al. |
| 8,531,050 B2 | 9/2013 | Barney et al. |
| 8,552,597 B2 | 10/2013 | Song et al. |
| 8,564,414 B2 | 10/2013 | Bergevoet |
| 8,571,905 B2 | 10/2013 | Risnoveanu et al. |
| 8,581,721 B2 | 11/2013 | Asher et al. |
| 8,593,283 B2 | 11/2013 | Smith |
| 8,593,291 B2 | 11/2013 | Townsend et al. |
| 8,597,111 B2 | 12/2013 | LeMay et al. |
| 8,608,535 B2 | 12/2013 | Weston et al. |
| 8,618,928 B2 | 12/2013 | Weed et al. |
| 8,621,245 B2 | 12/2013 | Shearer et al. |
| 8,635,126 B2 | 1/2014 | Risnoveanu et al. |
| 8,681,000 B2 | 3/2014 | August et al. |
| 8,682,729 B2 | 3/2014 | Werbitt |
| 8,686,579 B2 | 4/2014 | Barney et al. |
| 8,702,515 B2 | 4/2014 | Weston et al. |
| 8,708,821 B2 | 4/2014 | Barney et al. |
| 8,711,094 B2 | 4/2014 | Barney et al. |
| 8,742,623 B1 | 6/2014 | Biederman et al. |
| 8,753,165 B2 | 6/2014 | Weston |
| 8,758,136 B2 | 6/2014 | Briggs et al. |
| 8,773,245 B2 | 7/2014 | Canora et al. |
| 8,790,180 B2 | 7/2014 | Barney et al. |
| 8,797,146 B2 | 8/2014 | Cook et al. |
| 8,810,373 B2 | 8/2014 | Kim et al. |
| 8,810,430 B2 | 8/2014 | Proud |
| 8,814,688 B2 | 8/2014 | Barney et al. |
| 8,816,873 B2 | 8/2014 | Bisset et al. |
| 8,821,238 B2 | 9/2014 | Ackley et al. |
| 8,827,810 B2 | 9/2014 | Weston et al. |
| 8,830,030 B2 | 9/2014 | Arthurs et al. |
| 8,851,372 B2 | 10/2014 | Zhou et al. |
| 8,866,673 B2 | 10/2014 | Mendelson |
| 8,870,641 B2 | 10/2014 | Dabrowski |
| 8,888,576 B2 | 11/2014 | Briggs et al. |
| 8,913,011 B2 | 12/2014 | Barney et al. |
| 8,915,785 B2 | 12/2014 | Barney et al. |

(56) References Cited

U.S. PATENT DOCUMENTS

| | | |
|---|---|---|
| 8,917,172 B2 | 12/2014 | Charych |
| 8,923,994 B2 | 12/2014 | Laikari et al. |
| 8,924,432 B2 | 12/2014 | Richards et al. |
| 8,937,530 B2 | 1/2015 | Smith et al. |
| 8,961,260 B2 | 2/2015 | Weston |
| 8,961,312 B2 | 2/2015 | Barney et al. |
| 8,971,804 B2 | 3/2015 | Butler |
| 8,972,048 B2 | 3/2015 | Canora et al. |
| 9,002,264 B2 | 4/2015 | Zhang |
| 9,021,277 B2 | 4/2015 | Shearer et al. |
| 9,039,533 B2 | 5/2015 | Barney et al. |
| 9,072,965 B2 | 7/2015 | Kessman et al. |
| 9,087,246 B1 | 7/2015 | Chin et al. |
| 9,109,763 B1 | 8/2015 | Wein |
| 9,122,964 B2 | 9/2015 | Krawczewicz |
| 9,130,651 B2 | 9/2015 | Tabe |
| 9,138,650 B2 | 9/2015 | Barney et al. |
| 9,149,717 B2 | 10/2015 | Barney et al. |
| 9,162,148 B2 | 10/2015 | Barney et al. |
| 9,162,149 B2 | 10/2015 | Weston et al. |
| 9,178,569 B2 | 11/2015 | Chakravarty et al. |
| 9,186,585 B2 | 11/2015 | Briggs et al. |
| 9,196,964 B2 | 11/2015 | Baringer |
| 9,207,650 B2 | 12/2015 | Narendra et al. |
| 9,215,592 B2 | 12/2015 | Narendra et al. |
| 9,225,372 B2 | 12/2015 | Butler |
| 9,232,475 B2 | 1/2016 | Heinzelman et al. |
| 9,245,158 B2 | 1/2016 | Gudan et al. |
| 9,272,206 B2 | 3/2016 | Weston et al. |
| 9,318,898 B2 | 4/2016 | John |
| 9,320,976 B2 | 4/2016 | Weston |
| 9,367,852 B2 | 6/2016 | Canora et al. |
| 9,383,730 B2 | 7/2016 | Prestenback |
| 9,393,491 B2 | 7/2016 | Barney et al. |
| 9,393,500 B2 | 7/2016 | Barney et al. |
| 9,411,992 B1 | 8/2016 | Marek et al. |
| 9,412,231 B2 | 8/2016 | Dabrowski |
| 9,413,229 B2 | 8/2016 | Fleming |
| 9,424,451 B2 | 8/2016 | Kalhous et al. |
| 9,438,044 B2 | 9/2016 | Proud |
| 9,443,382 B2 | 9/2016 | Lyons |
| 9,446,319 B2 | 9/2016 | Barney et al. |
| 9,463,380 B2 | 10/2016 | Weston et al. |
| 9,468,854 B2 | 10/2016 | Briggs et al. |
| 9,474,962 B2 | 10/2016 | Barney et al. |
| 9,480,929 B2 | 11/2016 | Weston |
| 9,483,906 B2 | 11/2016 | LeMay et al. |
| 9,491,584 B1 | 11/2016 | Mendelson |
| 9,523,775 B2 | 12/2016 | Chakraborty et al. |
| 9,542,579 B2 | 1/2017 | Mangold et al. |
| 9,563,898 B2 | 2/2017 | McMahan et al. |
| 9,579,568 B2 | 2/2017 | Barney et al. |
| 9,582,981 B2 | 2/2017 | Rokhsaz et al. |
| 9,589,224 B2 | 3/2017 | Patterson et al. |
| 9,613,237 B2 | 4/2017 | Nikunen et al. |
| 9,616,334 B2 | 4/2017 | Weston et al. |
| 9,626,672 B2 | 4/2017 | Fisher |
| 9,642,089 B2 | 5/2017 | Sharma et al. |
| 9,646,312 B2 | 5/2017 | Lyons et al. |
| 9,651,992 B2 | 5/2017 | Stotler |
| 9,661,450 B2 | 5/2017 | Agrawal et al. |
| 9,675,878 B2 | 6/2017 | Barney et al. |
| 9,680,533 B2 | 6/2017 | Gudan et al. |
| 9,692,230 B2 | 6/2017 | Biederman et al. |
| 9,696,802 B2 | 7/2017 | Priyantha et al. |
| 9,706,924 B2 | 7/2017 | Greene |
| 9,707,478 B2 | 7/2017 | Barney et al. |
| 9,713,766 B2 | 7/2017 | Barney et al. |
| 9,731,194 B2 | 8/2017 | Briggs et al. |
| 9,737,797 B2 | 8/2017 | Barney et al. |
| 9,741,022 B2 | 8/2017 | Ziskind et al. |
| 9,743,357 B2 | 8/2017 | Tabe |
| 9,747,538 B2 | 8/2017 | Gudan et al. |
| 9,748,632 B2 | 8/2017 | Rokhsaz et al. |
| 9,754,139 B2 | 9/2017 | Chemishkian et al. |
| 9,754,202 B2 | 9/2017 | Gudan et al. |
| 9,756,579 B2 | 9/2017 | Zhou et al. |
| 9,762,292 B2 | 9/2017 | Manian et al. |
| 9,767,649 B2 | 9/2017 | Dabrowski |
| 9,770,652 B2 | 9/2017 | Barney et al. |
| 9,813,855 B2 | 11/2017 | Sahadi et al. |
| 9,814,973 B2 | 11/2017 | Barney et al. |
| 9,831,724 B2 | 11/2017 | Copeland et al. |
| 9,836,103 B2 | 12/2017 | Kramer et al. |
| 9,837,865 B2 | 12/2017 | Mitcheson et al. |
| 9,861,887 B1 | 1/2018 | Briggs et al. |
| 9,864,882 B1 | 1/2018 | Geist et al. |
| 9,867,024 B1 | 1/2018 | Larson |
| 9,871,298 B2 | 1/2018 | Daniel et al. |
| 9,888,550 B2 | 2/2018 | Wein |
| 9,909,896 B2 | 3/2018 | Bass et al. |
| 9,912,814 B2 | 3/2018 | Yoakum et al. |
| 9,928,527 B2 | 3/2018 | Woycik et al. |
| 9,928,681 B2 | 3/2018 | LeMay, Jr. et al. |
| 9,931,578 B2 | 4/2018 | Weston |
| 9,936,357 B2 | 4/2018 | Mills et al. |
| 9,940,682 B2 | 4/2018 | Hoffman et al. |
| 9,940,769 B2 | 4/2018 | Wooley |
| 9,942,968 B2 | 4/2018 | Wein |
| 9,949,219 B2 | 4/2018 | Belogolovy |
| 9,966,801 B2 | 5/2018 | Mitcheson et al. |
| 9,972,894 B2 | 5/2018 | Dion et al. |
| 9,993,724 B2 | 6/2018 | Barney et al. |
| 10,010,790 B2 | 7/2018 | Weston et al. |
| 10,022,624 B2 | 7/2018 | Barney et al. |
| 10,062,100 B2 | 8/2018 | Alvarez et al. |
| 10,070,269 B1 | 9/2018 | DeLuca et al. |
| 10,074,235 B2 | 9/2018 | Walker et al. |
| 10,074,268 B2 | 9/2018 | Hor-Lao et al. |
| 10,122,483 B2 | 11/2018 | Gonzales, Jr. |
| 10,127,747 B2 | 11/2018 | Spittle et al. |
| 10,129,728 B2 | 11/2018 | Sahadi et al. |
| 10,133,889 B2 | 11/2018 | Cletheroe et al. |
| 10,140,641 B2 | 11/2018 | Smith et al. |
| 10,152,840 B2 | 12/2018 | Geraghty et al. |
| 10,176,416 B1 | 1/2019 | Lektomiller |
| 10,187,773 B1 | 1/2019 | Zalewski et al. |
| 10,188,953 B2 | 1/2019 | Barney et al. |
| 10,192,157 B2 | 1/2019 | Cote et al. |
| 10,201,292 B2 | 2/2019 | Sharpe et al. |
| 10,216,283 B2 | 2/2019 | Acer et al. |
| 10,222,449 B2 | 3/2019 | Doescher et al. |
| 10,236,554 B2 | 3/2019 | Ackley et al. |
| 10,242,372 B2 | 3/2019 | Sullivan et al. |
| 10,257,916 B1 | 4/2019 | Wein |
| 10,275,029 B2 | 4/2019 | Jones et al. |
| 10,299,070 B2 | 5/2019 | Sahadi et al. |
| 10,315,115 B2 | 6/2019 | Pawlowski et al. |
| 10,322,353 B1 | 6/2019 | Goergen et al. |
| 10,360,419 B1 | 7/2019 | Yeh et al. |
| 10,360,777 B2 | 7/2019 | Lauria et al. |
| 10,367,372 B2 | 7/2019 | Huang et al. |
| 10,373,170 B2 | 8/2019 | Baker et al. |
| 10,373,395 B1 | 8/2019 | Harned et al. |
| 10,380,857 B1 | 8/2019 | Bergman et al. |
| 10,395,151 B2 | 8/2019 | Austin et al. |
| 10,397,741 B2 | 8/2019 | Baarman et al. |
| 10,421,023 B2 | 9/2019 | Ikemoto et al. |
| 10,461,812 B2 | 10/2019 | Zhou et al. |
| 10,478,719 B2 | 11/2019 | Weston et al. |
| 10,520,328 B2 | 12/2019 | Gurel et al. |
| 10,537,803 B2 | 1/2020 | Yeh et al. |
| 10,546,228 B2 | 1/2020 | Daoura et al. |
| 10,559,144 B2 | 2/2020 | Spittle et al. |
| 10,603,564 B2 | 3/2020 | Yeh et al. |
| 10,609,135 B2 | 3/2020 | Carlos et al. |
| 10,651,691 B2 | 5/2020 | Larosa et al. |
| 10,657,431 B2 | 5/2020 | Lektomiller |
| 10,661,184 B2 | 5/2020 | Stenzler |
| 10,672,229 B2 | 6/2020 | Guinn et al. |
| 10,680,677 B2 | 6/2020 | Wobak et al. |
| 10,685,383 B2 | 6/2020 | Soni et al. |
| 10,688,378 B2 | 6/2020 | Aman et al. |
| 10,699,084 B2 | 6/2020 | Yeh et al. |

(56) References Cited

U.S. PATENT DOCUMENTS

| | | |
|---|---|---|
| 10,733,394 B2 | 8/2020 | Kelly et al. |
| 10,733,495 B2 | 8/2020 | Ennis et al. |
| 10,733,544 B2 | 8/2020 | Sahadi |
| 10,758,818 B2 | 9/2020 | Barney et al. |
| 10,780,359 B2 | 9/2020 | Leiba et al. |
| 10,811,762 B2 | 10/2020 | Ackley et al. |
| 10,818,152 B2 | 10/2020 | Yeh et al. |
| 10,819,137 B2 | 10/2020 | Khoche et al. |
| 10,839,178 B2 | 11/2020 | Yeh et al. |
| 10,845,975 B2 | 11/2020 | Vyas et al. |
| 10,861,267 B2 | 12/2020 | Aman |
| 10,867,228 B2 | 12/2020 | Lowe |
| 10,874,755 B2 | 12/2020 | Majdali et al. |
| 10,915,738 B2 | 2/2021 | Egger et al. |
| 10,952,029 B1 | 3/2021 | Kawaguchi et al. |
| 10,959,626 B2 | 3/2021 | Li et al. |
| 10,964,147 B2 | 3/2021 | Spittle et al. |
| 10,970,497 B2 | 4/2021 | Caselli et al. |
| 10,970,725 B2 | 4/2021 | Yeh et al. |
| 10,976,818 B2 | 4/2021 | Lin |
| 10,990,960 B2 | 4/2021 | Koeppel |
| 11,011,037 B2 | 5/2021 | Bergman et al. |
| 11,022,690 B2 | 6/2021 | Cavallaro et al. |
| 11,024,970 B2 | 6/2021 | Nasimuddin et al. |
| 11,025,305 B2 | 6/2021 | Yeh et al. |
| 11,030,266 B2 | 6/2021 | Sahadi |
| 11,031,824 B2 | 6/2021 | Coelho De Souza et al. |
| 11,038,262 B2 | 6/2021 | Yehezkely |
| 11,038,553 B2 | 6/2021 | Ding et al. |
| 11,043,071 B2 | 6/2021 | Crittenden |
| 11,044,329 B2 | 6/2021 | Weis et al. |
| 11,050,462 B2 | 6/2021 | Loe |
| 11,062,375 B1 | 7/2021 | Cronin et al. |
| 11,064,373 B2 | 7/2021 | Rokhsaz |
| 11,064,431 B2 | 7/2021 | Calvarese et al. |
| 11,069,187 B2 | 7/2021 | Reeves |
| 2005/0204825 A1 | 9/2005 | Kunerth et al. |
| 2007/0270672 A1 | 11/2007 | Hayter |
| 2010/0134286 A1 | 6/2010 | Potyrailo et al. |
| 2012/0286938 A1 | 11/2012 | Cote et al. |
| 2013/0249301 A1 | 9/2013 | Smoot et al. |
| 2013/0324059 A1 | 12/2013 | Lee et al. |
| 2014/0122170 A1 | 5/2014 | Padgett et al. |
| 2014/0162693 A1 | 6/2014 | Wachter et al. |
| 2015/0046202 A1 | 2/2015 | Hunt |
| 2015/0078140 A1 | 3/2015 | Riobo Aboy et al. |
| 2015/0138556 A1 | 5/2015 | LeBoeuf et al. |
| 2015/0145671 A1 | 5/2015 | Cohen et al. |
| 2015/0186701 A1 | 7/2015 | Otis et al. |
| 2015/0194817 A1 | 7/2015 | Lee et al. |
| 2015/0236551 A1 | 8/2015 | Shearer et al. |
| 2015/0255226 A1 | 9/2015 | Rouvala et al. |
| 2015/0312517 A1 | 10/2015 | Hoyt et al. |
| 2015/0336013 A1 | 11/2015 | Stenzler et al. |
| 2015/0363617 A1 | 12/2015 | Honore |
| 2015/0371194 A1 | 12/2015 | Marshall et al. |
| 2016/0019423 A1 | 1/2016 | Ortiz et al. |
| 2016/0020636 A1 | 1/2016 | Khlat |
| 2016/0020637 A1 | 1/2016 | Khlat |
| 2016/0067600 A1 | 3/2016 | Barney et al. |
| 2016/0144280 A1 | 5/2016 | Pawlowski et al. |
| 2016/0170998 A1 | 6/2016 | Frank et al. |
| 2016/0171484 A1 | 6/2016 | Liu |
| 2016/0182165 A1 | 6/2016 | Margon et al. |
| 2016/0203663 A1 | 7/2016 | Proctor |
| 2016/0217496 A1 | 7/2016 | Tuchman et al. |
| 2016/0226610 A1 | 8/2016 | Pinzon Gonzales, Jr. |
| 2016/0267769 A1 | 9/2016 | Rokhsaz et al. |
| 2016/0307398 A1 | 10/2016 | Walker et al. |
| 2016/0321548 A1 | 11/2016 | Ziskind et al. |
| 2016/0373522 A1 | 12/2016 | Carlos et al. |
| 2017/0091850 A1 | 3/2017 | Alvarez et al. |
| 2017/0093463 A1 | 3/2017 | Wang et al. |
| 2017/0115018 A1 | 4/2017 | Mintz |
| 2017/0132438 A1 | 5/2017 | Cletheroe et al. |
| 2017/0162006 A1 | 6/2017 | Sahadi et al. |
| 2017/0169449 A1 | 6/2017 | Heaven et al. |
| 2017/0186270 A1 | 6/2017 | Acres |
| 2017/0201003 A1 | 7/2017 | Ackley et al. |
| 2017/0228804 A1 | 8/2017 | Soni et al. |
| 2017/0235369 A1 | 8/2017 | Acer et al. |
| 2017/0237466 A1 | 8/2017 | Carr |
| 2017/0270507 A1 | 9/2017 | Wang et al. |
| 2017/0270734 A1 | 9/2017 | Geraghty et al. |
| 2017/0288735 A1 | 10/2017 | Zhou et al. |
| 2017/0293985 A1 | 10/2017 | Deria et al. |
| 2017/0331509 A1 | 11/2017 | Gollakota et al. |
| 2017/0340961 A1 | 11/2017 | Weston et al. |
| 2017/0348593 A1 | 12/2017 | Barney et al. |
| 2017/0358957 A1 | 12/2017 | Mitcheson et al. |
| 2017/0361236 A1 | 12/2017 | Barney et al. |
| 2017/0373526 A1 | 12/2017 | Huang et al. |
| 2018/0005487 A1 | 1/2018 | Lyons et al. |
| 2018/0008897 A1 | 1/2018 | Ackley et al. |
| 2018/0014385 A1 | 1/2018 | Wein |
| 2018/0078853 A1 | 3/2018 | Barney et al. |
| 2018/0126284 A1 | 5/2018 | Tarng et al. |
| 2018/0137700 A1 | 5/2018 | Finnegan et al. |
| 2018/0214769 A1 | 8/2018 | Briggs et al. |
| 2018/0240151 A1 | 8/2018 | D'andrea et al. |
| 2018/0240176 A1 | 8/2018 | Cronin et al. |
| 2018/0292542 A1 | 10/2018 | Anand |
| 2018/0318723 A1 | 11/2018 | Weston |
| 2018/0339226 A1 | 11/2018 | Barney et al. |
| 2019/0009171 A1 | 1/2019 | Barney et al. |
| 2019/0038970 A1 | 2/2019 | Weston et al. |
| 2019/0125219 A1 | 5/2019 | Sharpe et al. |
| 2019/0164177 A1 | 5/2019 | Yeh et al. |
| 2019/0168120 A1 | 6/2019 | Cossairt et al. |
| 2019/0180540 A1 | 6/2019 | Usi et al. |
| 2019/0220634 A1 | 7/2019 | Cossairt et al. |
| 2019/0220636 A1 | 7/2019 | Yeh et al. |
| 2019/0221088 A1 | 7/2019 | Yeh et al. |
| 2019/0318539 A1 | 10/2019 | Weston |
| 2019/0325494 A1 | 10/2019 | Shannon et al. |
| 2020/0005364 A1 | 1/2020 | Aznaurashvili et al. |
| 2020/0111345 A1 | 4/2020 | Li et al. |
| 2020/0164268 A1 | 5/2020 | Weston et al. |
| 2020/0215406 A1 | 7/2020 | Yeh et al. |
| 2020/0226705 A1 | 7/2020 | Brans |
| 2020/0234385 A1 | 7/2020 | Vanslette et al. |
| 2020/0289950 A1 | 9/2020 | Krauthamer et al. |
| 2020/0297269 A1 | 9/2020 | Vieri |
| 2020/0320585 A1 | 10/2020 | Soule et al. |
| 2020/0376397 A1 | 12/2020 | Leiba et al. |
| 2021/0027587 A1 | 1/2021 | Yeh et al. |
| 2021/0056273 A1 | 2/2021 | Yeh et al. |
| 2021/0072888 A1 | 3/2021 | Vyas et al. |
| 2021/0090094 A1 | 3/2021 | Bond et al. |
| 2021/0216139 A1 | 7/2021 | Lin |
| 2021/0220749 A1 | 7/2021 | Karafin et al. |
| 2021/0233372 A1 | 7/2021 | Bergman et al. |

FOREIGN PATENT DOCUMENTS

| | | |
|---|---|---|
| GB | 2425691 A | 11/2006 |
| JP | 2003288472 A | 10/2003 |
| JP | 2004126791 A | 4/2004 |
| JP | 2005267179 A | 9/2005 |
| JP | 2010000178 A | 1/2010 |
| JP | 2012244846 A | 12/2012 |
| JP | 2013188019 A | 9/2013 |
| JP | 6152919 B1 | 6/2017 |
| JP | 6355002 B2 | 7/2018 |
| JP | 2018120312 | 8/2018 |
| JP | 6400742 B2 | 10/2018 |
| JP | 2018163486 | 10/2018 |
| JP | 2018530812 | 10/2018 |
| JP | 6547842 B2 | 7/2019 |
| JP | 6560972 B2 | 8/2019 |
| JP | 6621893 B2 | 12/2019 |
| JP | 6707100 B2 | 6/2020 |
| JP | 2020525928 | 8/2020 |
| JP | 6749891 B2 | 9/2020 |

(56) References Cited

FOREIGN PATENT DOCUMENTS

| | | |
|---|---|---|
| JP | 6778280 B2 | 10/2020 |
| JP | 2020166885 | 10/2020 |
| JP | 2021509609 | 4/2021 |
| JP | 2021510580 | 4/2021 |
| JP | 2021510893 | 4/2021 |
| JP | 2021510957 | 4/2021 |
| WO | WO-2008/0388896 A1 | 4/2008 |
| WO | 2016193549 A1 | 12/2016 |

OTHER PUBLICATIONS

PCT International Search Report & Written Opinion; PCT Application No. PCT/US2019/012935; dated Mar. 27, 2019.

INTERACTIVE SYSTEMS AND METHODS WITH TRACKING DEVICES

CROSS-REFERENCE TO RELATED APPLICATIONS

This application is a continuation of U.S. Non-Provisional application Ser. No. 16/508,052, entitled "INTERACTIVE SYSTEMS AND METHODS WITH TRACKING DEVICES," filed on Jul. 10, 2019, which is a continuation of U.S. Non-Provisional application Ser. No. 15/882,761, now U.S. Pat. No. 10,360,419, entitled "INTERACTIVE SYSTEMS AND METHODS WITH TRACKING DEVICES," filed on Jan. 29, 2018, which claims priority to and the benefit of U.S. Provisional Application No. 62/617,510, entitled "INTERACTIVE SYSTEMS AND METHODS WITH TRACKING DEVICES," filed Jan. 15, 2018, which are hereby incorporated by reference in their entireties for all purposes.

FIELD OF DISCLOSURE

The present disclosure relates generally to interactive systems and methods. More specifically, embodiments of the present disclosure relate to interactive systems and methods that utilize a wearable device to track a guest's interactions in an amusement park.

BACKGROUND

Amusement parks and/or theme parks may include various entertainment attractions. Some existing attractions may provide guests with an immersive or interactive experience. For example, guests may visit areas having various features, such as audio, video, and special effects. With the increasing sophistication and complexity of modern attractions, and the corresponding increase in expectations among amusement park and/or theme park guests, improved and more creative attractions are needed, including attractions that provide a more interactive and personalized experience.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a wearable device includes a radio-frequency identification (RFID) tag having a memory that stores identification information. The wearable device also includes a power harvesting circuit configured to harness power from electromagnetic radiation. Further, the wearable device includes a sensor coupled to the power harvesting circuit and configured to utilize the power to monitor a condition of the wearable device. Even further, the wearable device includes a microcontroller coupled to the sensor and configured to write data indicative of the condition to the memory of the RFID tag, wherein the RFID tag is configured to transmit the identification information and the data in response to receipt of the electromagnetic radiation from an RFID reader.

In one embodiment, a system includes a wearable device having a radio-frequency identification (RFID) tag. The RFID tag has a memory that stores identification information, and the RFID tag is configured to transmit the identification information to an RFID reader in response to receipt of electromagnetic radiation from the RFID reader. Further, the wearable device includes a tracking device supported by the wearable device and configured to facilitate tracking a position of the wearable device. Even further, the wearable device includes a power harvesting circuit supported by the wearable device and configured to harness power from the received electromagnetic radiation, wherein the harnessed power is utilized to transmit the identification information and to operate the tracking device. Further still, the system includes a processor configured to receive the identification information from the RFID reader and a signal indicative of the position of the wearable device, wherein the processor is configured to detect an interaction between the wearable device and an element of an attraction based on the received identification information and the received signal.

In one embodiment, a method includes transmitting electromagnetic radiation from a radio-frequency identification (RFID) reader. Further, the method includes harvesting power from the electromagnetic radiation using a power harvesting circuit of a wearable device. Further, the method includes utilizing the harvested power to operate a sensor supported by the wearable device to monitor a position of the wearable device. Even further, the method includes utilizing the harvested power to operate a microcontroller supported by the wearable device to write data indicative of the monitored position to a memory of a RFID tag supported by the wearable device. Then, the method includes transmitting identification information and the data from the memory of the RFID tag to the RFID reader in response to receipt of the electromagnetic radiation from the RFID reader.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
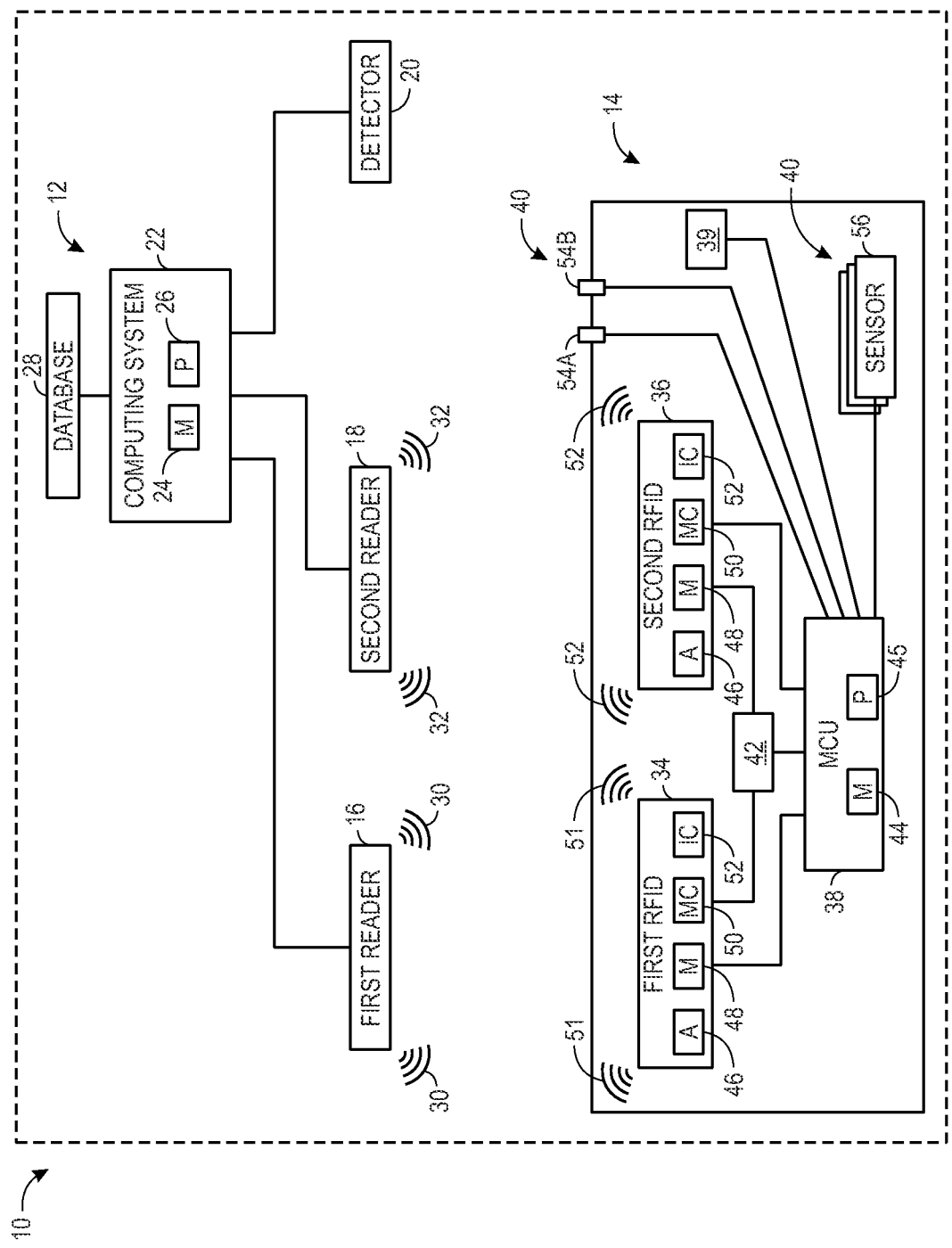
FIG. 1 is a schematic diagram of an interactive system, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Amusement parks feature a wide variety of entertainment, such as amusement park rides, performance shows, and games. The different types of entertainment may include features that enhance a guest's experience at the amusement park. For example, an attraction may include a game that has a touchscreen display that detects a guest's touch at a rendered image shown on the display screen. However, some interactive systems may provide a suboptimal experience due to inadequate or unreliable detection of the guest's interaction (e.g., recognition by the interactive system) with an interactive element (e.g., the rendered image shown on the display screen). Furthermore, it is now recognized that it is desirable for interactive systems to determine an identity of the guest that interacted with the interactive element, and thus, accurately and efficiently track points or other game statistics for each guest.

Accordingly, the present disclosure relates to systems and methods that utilize wearable devices (e.g., wearable by one or more guests) to track a guest's interactions with interactive elements. More particularly, the present disclosure relates to an interactive system that includes one or more radio-frequency identification (RFID) readers and multiple wearable devices, which each have one or more RFID tags and one or more tracking devices (e.g., light emitters and/or sensors). The tracking devices may be part of a tracking system that includes one or more components configured to generate a signal indicative of a guest's interactions with interactive elements. In an embodiment, certain tracking devices (e.g., light emitting diodes [LEDs]) of the wearable devices may also provide a visual indication of a successful interaction with an interactive element of an attraction to a guest wearing the wearable device.

As used below, the term "user" may refer to a user of the interactive system, and the user may be a guest at an amusement park. By way of example, a user may wear or carry the wearable device having the one or more tracking devices as the user travels through an attraction. The attraction may have various interactive elements, which may be any of a variety of images or objects (e.g., rendered images, virtual elements, or graphical elements presented on a display screen; physical objects or targets; costumed characters). To experience the attraction, the user may interact with the interactive elements, such as by touching a physical target or approaching a costumed character, for example.

In one embodiment, the tracking device may be a sensor (e.g., motion sensor, such as an accelerometer) that generates a signal indicative of a condition (e.g., position or movement) of the wearable device. A microcontroller of the wearable device may be coupled to the sensor and may write data indicative of the condition (e.g., based on the signal) to a memory of the RFID tag of the wearable device. As discussed in more detail below, the data may then be transferred from the RFID tag to an RFID reader, which may be positioned at a location within the attraction and/or proximate to certain interactive elements. A computing system that is communicatively coupled to the RFID reader may process the data, such as to determine that the user performed a particular movement (e.g., wave or jab) and/or to assign points to the user, for example.

In one embodiment, the tracking device may be a LED, and light emitted by the LED may be detected by a detector (e.g., light detector or camera) that is communicatively coupled to a computing system. The computing system may receive and process a signal from the detector to determine the location of the wearable device, to determine that the user performed a particular movement (e.g., wave or jab), and/or to assign points to the user, for example. As discussed in more detail below, the communication between one or more RFID readers within the attraction and the RFID tag of the wearable device may cause the LED to illuminate, thereby providing feedback to notify the user that the communication between the one or more RFID readers and the RFID tag has occurred. Because the one or more RFID readers may be positioned at an entrance of the attraction or proximate to the various interactive elements, illumination of the LED may also indicate to the user that the interactive system has detected the user within the attraction and/or has detected the user's interaction with an interactive element, for example.

Thus, the tracking device may enable the interactive system to track a user's movements (e.g., touching a target, dancing, waving, jabbing, or various other gestures), which in turn may also enable the interactive system to track the user's progress (e.g., game statistics) as the user travels through the attraction. For example, the interactive system may detect and keep track of the number of targets contacted by the user and/or the number of costumed characters met by the user.

Turning now to the drawings, FIG. 1 is a schematic representation of an interactive system 10 including a reader system 12 (e.g., radio-frequency identification [RFID] reader system) and a wearable device 14. In one embodiment, the wearable device 14 is a wearable or portable device, such as a bracelet, necklace, charm, pin, or toy, that may be worn or carried by a user as the user travels through an attraction. As discussed in more detail below, the reader system 12 is capable of communicating with the wearable device 14 through electromagnetic radiation, and the communication enables tracking of the user's progress through the attraction (e.g., number of rides completed, areas visited, interactive elements contacted, costumed characters met, virtual achievements won). The communication may also enable the wearable device 14 to provide feedback indicative of the progress and/or various interactions to the user through a feedback response (e.g. light) output by the wearable device 14.

In one embodiment, the reader system 12 may include a first reader 16, a second reader 18, and a detector 20 (e.g., a light detector or camera) that are communicatively coupled to a computing system 22 (having a memory 24 and a processor 26) that accesses information stored in one or more databases 28 (e.g., cloud-based storage system.) Generally, the first reader 16 and the second reader 18 transmit electromagnetic radiation (e.g., signals) to the wearable device 14. In one embodiment, the first reader 16 transmits signals 30 of one frequency (e.g., range), and the second reader 18 transmits signals 32 of another frequency (e.g., range) that is different from the first frequency. In addition to transmitting signals 30, 32, the first reader 16 and the second reader 18 can receive signals, such as signals from the wearable device 14 and signals from the computing system 22. In one embodiment, the computing system 22 instructs the readers (e.g., the first reader 16 and the second reader 18) to send signals 30, 32 to the wearable device 14 based on information stored in data encoded in the one or more databases 28. Thus, it should be appreciated that the first reader 16 and the second reader 18 may be transceivers that are capable of both sending and receiving signals. In one embodiment, the detector 20 detects light emitted from the wearable device 14, and the detection may be used to detect or verify a successful interaction, for example.

As illustrated in FIG. 1, one embodiment of the wearable device 14 includes a first RFID tag 34, a second RFID tag 36, a microcontroller 38, a feedback device 39 (e.g., LEDs, speaker, haptics), one or more tracking devices 40 (e.g., LED or sensor), and power circuitry 42 that cooperate to enable the wearable device 14 of the interactive system 10 to function as disclosed. In one embodiment, the feedback device 39 may also operate as the tracking device 40. The first RFID tag 34 and the second RFID tag 36 each include an antenna 46 that transmits and receives signals, a memory 48 storing information (e.g., unique identification code), a microchip 50, and an integrated circuit 52 to power the microchip 50. Additionally, the integrated circuit 52 powers the power circuitry 42, which provides power to the microcontroller 38. In one embodiment, the power circuitry 36 may include an energy storage device (e.g., capacitor, super capacitor, a battery) configured to store power. As shown, the microcontroller 38 of the wearable device 14 includes a memory 44 and a processor 45. The memory 44 stores computer-readable instructions that are executed by the processor 45 to control operation of the microcontroller 38 and other components of the wearable device 14. In one embodiment, the microcontroller 38 provides signals to the feedback device 39 to cause the feedback device 39 to provide a feedback response that signifies to the user that a successful communication between the wearable device 14 and the reader system 12 has occurred.

In one embodiment, the wearable device 14 may include the tracking device 40. In general, the tracking device 40 may be used to detect or verify user interactions with the interactive elements of the attraction. To facilitate discussion of various tracking devices 40 that may be used in the wearable device 14, the wearable device 14 of FIG. 1 includes two different types of tracking devices 40 (e.g., LEDs 54a, 54b and sensors 56); however, it should be appreciated that any number (e.g., 1, 2, 3, 4, or more) and various types of tracking devices 40 may be used in the wearable device 14. As shown, one tracking device 40 includes one or more LEDs 54a, 54b, and one tracking device 40 includes one or more sensors 56. The LEDs 54a, 54b and/or the sensors 56 receive control signals from the microcontroller 38, and may also receive power from the power circuitry 42. The LEDs 54a, 54b emit light in response to control signals from the microcontroller 38, and the emitted light may then be detected by the detector 20. The sensors 56 may include an accelerometer, a gyrometer, a pressure sensor, a sound sensor, or a light detector, for example.

In general, the antenna 46 of the first RFID tag 34 is designed to receive signals 24 from the first reader 16, and the antenna 46 of the second RFID tag 36 is designed to receive signals 26 from the second reader 18 of the reader system 12. In one embodiment, the microcontroller 38 identifies interactions between the tags 34, 36 and the readers 16, 18 and sends signals (e.g., control signals) to cause illumination of one or more of the LEDs 54. In one embodiment, the LEDs 54 may emit visible light to provide feedback to the user. Thus, the LEDs 54 may operate as the feedback device 29 to provide feedback to the user, in addition to operating as the tracking device 40 to enable the computing system 22 to track the position of the user. In one embodiment, the wearable device 14 of the interactive system 10 may contain additional or alternative feedback devices 39, such as audio devices configured to emit sound or haptics configured to provide a tactile output (e.g., vibration). The light emitted by the LEDs 54 may be detected by the detector 20, which may provide a signal indicative of the detected light to the computing system 22. Backscatter indicative of a unique identification code may also be emitted by the first RFID tag 34 and/or the second RFID tag 36, and the backscatter is utilized by the computing system 22 to identify the user to facilitate tracking the user's progress (e.g., game statistics) as the user travels through the attraction.

More particularly, the first reader 16 of the reader system 12 continuously transmits signals 30. The antenna 46 of the first RFID tag 34 is configured to receive electromagnetic radiation (e.g., signals 30) from the first reader 16, as well as transmit signals 51 to the first reader 16. The integrated circuit 44 converts the electromagnetic radiation received by the antenna 46 into electricity to provide power to the microchip 50, which generates a backscatter (e.g., signal 51). The backscatter contains information (e.g., unique identification code) stored in the memory 48 of the first RFID tag 34. The backscatter (e.g., signal 51) is received by the first reader 16, which may send a signal to the computing system 22. The computing system 22 may process the signal to determine the identity of the user associated with the wearable device 14 (e.g., the user may register the wearable device 14 to associate the wearable device 14 with the user prior to experiencing the attraction) and/or to update information (e.g., game statistics) for the wearable device 14 in the one or more databases 28. In this manner, the interactive system 10 may detect the presence of the user within the attraction and/or track the user's progress (e.g., general location and/or game statistics) as the user travels through the attraction.

Furthermore, once power is supplied to the microcontroller 38, the processor 45 of the microcontroller 38 may also receive and process a signal from the first RFID tag 34 that indicates that the signal 30 from the first reader 16 was received at the first RFID tag 34. The processor 45 of the microcontroller 38 may then execute instructions stored on the memory 44 of the microcontroller 38 to illuminate one or more of the LEDs 54a, 54b to facilitate tracking and/or to provide feedback to the user. In one embodiment, the microcontroller 38 may be programmed to provide a certain type of illumination (e.g., number of lights, color, blinking pattern, length of time) in response to the signal that indicates that the signal 30 from the first reader 16 was received at the first RFID tag 34. For example, when the first RFID tag 34 receives the signal 30 from the first RFID reader 16, the microcontroller 38 may cause a first LED 54a to illuminate. In one embodiment, the signals 30 transmitted by the first reader 16 are ultra-high frequency (UHF) signals (e.g., having a frequency between approximately 300 megahertz and 3 gigahertz). As such, the first RFID tag 34 may receive signals 51 from the first reader 16 when the first RFID tag 34 is located a relatively far distance (e.g., up to approximately 3, 4, 5, 6, 7, 8, or more meters) away from the first reader 16.

Additionally, the second reader 18 may continuously transmit signals 32. The antenna 46 of the second RFID tag 36 is configured to receive electromagnetic radiation (e.g., signals 32) from the second reader 18. The integrated circuit 44 converts the radiation received by the antenna 46 into electricity to provide power to the microchip 50, which generates a backscatter (e.g., signal 52). The backscatter contains information (e.g., unique identification code) stored in the memory 46 of the second RFID tag 36. It should be appreciated that in some embodiments, the information stored in the respective memories 40 of the first RFID tag 34 and the second RFID tag 36 may be linked (e.g., the backscatter generated in response to receipt of the signals 32 at the second RFID tag 36 may contain the information stored in the memory 46 of the first RFID tag 34), or the first RFID tag 34 and the second RFID tag 36 may share one memory 46 (e.g., be a dual RFID tag capable of receiving different frequency signals). The backscatter (e.g., signal 52) is received by the second reader 18, which may send a signal to the computing system 22. The computing system 22 may process the signal to determine the identity of the user associated with the wearable device 14 and/or to update information (e.g., game statistics) for the wearable device 14 in the one or more databases 28. Because the first RFID reader 16 may be associated with a particular area (e.g., room) of the attraction and the second RFID reader 18 may be associated with a particular interactive element (e.g., physical or virtual target) of the attraction, the computing system 22 may track both the general location of the user, as well as the user's interactions with the interactive elements. In this manner, the interactive system 10 may track the user's progress (e.g., general location and/or game statistics) as the user travels through the attraction.

Furthermore, once power is supplied to the microcontroller 38, the processor 45 of the microcontroller 38 may also receive and process a signal from the second RFID tag 36 that indicates that the signal 30 from the second reader 18 was received at the second RFID tag 36. The processor 45 of the microcontroller 38 may then execute instructions stored on the memory 44 of the microcontroller 38 to illuminate one or more of the LEDs 54a, 54b to facilitate tracking and/or provide feedback to the user. In one embodiment, the microcontroller 38 may be programmed to provide a certain type of illumination (e.g., number of lights, color, blinking pattern, length of time) in response to the signal that indicates that the signal 32 from the second reader 18 was received at the second RFID tag 36. For example, when the second RFID tag 36 receives the signal 32 from the second RFID reader 18, the microcontroller 38 may cause a second LED 54b to illuminate. In one embodiment, the signals 32 transmitted by the second reader 16 are near-field communication (NFC) signals (e.g., having a frequency between approximately 10 to 20 megahertz). As such, the second RFID tag 36 may receive signals 32 from the second reader 18 when the second RFID tag 36 is within a relatively short distance (e.g., approximately 1, 2, 3, 4, or 5 centimeters) of the first reader 16. Because the first RFID reader 16 may be associated with a particular area (e.g., room) of the attraction and the second RFID reader 18 may be associated with a particular interactive element (e.g., target) of the attraction, the illumination of the LEDs 54 on the wearable device 14 may enable precise tracking and/or multiple types of feedback to the user. For example, illumination of the first LED 54a in response to receipt of the signals 30 from the first RFID reader 16 may notify the user that the interactive system 10 has detected the user within the particular area of the attraction, while illumination of the second LED 54b in response to receipt of the signals 32 from the second RFID reader 18 may notify the user that the interactive system 10 has detected the user's interaction with the particular interactive element. As discussed in more detail below, detection of the light from the LED 54a, 54b by the detector 20 may provide additional data (e.g., in addition to the data received via the RFID readers 16, 18) to enable the computing system 22 to determine that the user is within the particular area of the attraction or has interacted with the interactive element.

In general, the second reader 18 operates similarly to the first reader 16; however, the first reader 16 communicates with the first RFID tag 34 (and not the second RFID tag 36), while the second reader 18 communicates with the second RFID tag 36 (and not the first RFID tag 34). The wearable device 14 may include at least two RFID tags 28, 30 that are each configured to communicate with respective readers 16, 18 that transmit signals 30, 32 that travel different distances. The first RFID tag 34 and the first reader 16 that communicate over a relatively long distance enable tracking a general location of the wearable device 14 and charging the wearable device 14, while the second RFID tag 36 and the second reader 18 that communicate over a relatively short distance enable monitoring interactions based on a contact (or close proximity) between the user and interactive elements in the attraction. However, it should be appreciated that the second RFID tag 36 may be used to charge the wearable device 14.

In one embodiment, the interactive system 10 may include multiple first readers 16 at different locations within an attraction. As a user moves through the attraction, the user's location is updated in the database 28 based on which first reader 16 is currently communicating with the wearable device 14. In one embodiment, feedback may be provided to the user based on each interaction with each one of the first readers 16. For example, one first reader 16 may be positioned at an entrance of the attraction, and another first reader 16 may be positioned in a room or area of the attraction. In this case, the wearable device 14 provides feedback (e.g., illumination of the first LED 54a) upon the user entering the attraction, thereby notifying the user that they have been detected by the interactive system 10. Then, once the user enters the room or area, the wearable device 14 provides another feedback (e.g., the same feedback or a different feedback, such as illumination of the second LED 54b), thereby notifying the user that they have been detected by the interactive system 10 as being within the new area. The one or more LEDs 54 may also be used in cooperation with the detector 20 to provide tracking of the user.

In one embodiment, one or more first readers 16 and one or more second readers 18 may cooperate to improve the user's immersive experience. For example, the user may enter an area containing one or more first readers 16. The area may include one or more targets each associated with or proximate to one or more second readers 18. As discussed above, once the wearable device 14 is within a range (e.g., a relatively long range) of one first reader 16 in the area, the wearable device 14 communicates with the one first reader 16, the database 28 is updated, and the wearable device 14 may provide feedback to the user that they have been detected within the area. Additionally, once the wearable device 14 is within a range (e.g., a relatively short range) of one second reader 18 (e.g., due to the user hitting, touching, or walking by the target associated with the one second reader 18), the wearable device 14 communicates with the one second reader 18, the database 28 is updated, and the wearable device 14 may provide feedback to the user that they have successfully interacted with the target (e.g., points have been assigned). Thus, communication between the wearable device 14 and the first readers 16 may provide relatively long range tracking (e.g., identifying that the user is in a general location defined by the range of the first reader 16) of a user throughout the amusement park. Moreover, communication between the wearable device 14 and the second readers 18 may provide tracking within a relatively shortly range. In one embodiment, detectors 20 may be disposed in various portions of the attraction, such as proximate to the interactive elements and/or the second readers 18 to detect the light emitted by the LED(s) 54 in response to the communication between the second reader 18 and the second RFID tag 36.

In one embodiment, the computing system 22 may award points to the user if (e.g., only if) the detector 20 detects the light emitted by the LEDs 54 of the wearable device 14, as such detection may indicate the user has properly positioned their wearable device 14 relative to the interactive element. In one embodiment, the computing system 22 may award points to the user if (e.g., only if) the detector 20 detects that the wearable device 14 worn by the user is in motion (e.g., the user is waving their hand or hitting the target) during (or immediately prior to or immediately after) the interaction or communication between the second reader 18 and the second RFID tag 36 of the wearable device 14. In one embodiment, the detector 20 may detect a characteristic (e.g., color, wavelength, blinking pattern) of the LED 54 of the tracking device 40. The characteristic of the LED(s) 54 may be associated with one wearable device 14 or a group of wearable devices 14. Accordingly, detection of the characteristic may be used by the computing system 22 to determine or to verify the identity of the guest that completed the interaction with the interactive element. As such, when the detector 20 detects light, light indicative of motion, or light having the characteristic, the computing system 22 may award the user points based on a successful interaction indicated by both communication between the wearable device 14 and the second reader 18 and detection of the light emitted by the LEDs 54 at the detector 20.

As discussed herein, in one embodiment, the tracking device 40 may include a sensor 56. The sensor 56 may be a gyrometer, accelerometer, pressure sensor, light sensor, or sound sensor, and the microcontroller 38 of the wearable device may provide control signals and/or power to operate the sensor 56. In general operation, the sensor 56 may detect a condition (e.g., movement, position, sound, pressure, or light) that is indicative of the user interacting with an interactive element of the attraction. For example, when the sensor 56 is an accelerometer, the sensor 56 may detect movement of the wearable device 14 by the user, such as jabbing, dancing, or various other gestures. When the sensor 56 is a light detector, the sensor 56 may detect the presence or absence of light. The microcontroller 38 may receive data from the sensor 56 and write data to the memory 48 of one or more of the RFID tags 34, 36. The data may be transmitted (e.g., through backscatter) by the antenna 46 of the one or more RFID tags 34, 36 and read by the respective readers 16, 18. Then, based on the data received by the readers 16, 18, the computer system 22 updates the database 28 and awards points to the user.

As noted above, in one embodiment, the antenna 46 of the first RFID tag 34 may only receive UHF waves, while the antenna 46 of the second RFID tag 36 may only receive NFC waves. For example, the first RFID tag 34 may only communicate (e.g., receive or transmit) with UHF waves, and the second RFID tag 36 may only communicate with NFC waves. As UHF signals travel a longer distance, the first RFID tag 34 may frequently or continuously receive the UHF signals emitted by the first readers 16 as the user travels through the attraction, but the second RFID tag 36 may only receive the NFC signals emitted by the second readers 18 when the user positions the wearable device 14 close to the second readers 18. Thus, in one embodiment, the UHF signal may be used for powering or charging the wearable device 14 (e.g., via power harvesting by the integrated circuit 44 and power circuitry 36). However, the NFC signal may also be used for powering or charging the wearable device 14 in a similar manner.

It should be appreciated that the interactive system 10 may track multiple users and/or provide feedback on multiple wearable devices 14. For example, multiple users may each wear a respective wearable device 14 that is configured to communicate with multiple first readers 16 and second readers 18 disposed in different locations within the attraction. It should also be appreciated that in one embodiment, the wearable device 14 of the interactive system 10 may include a single RFID tag (e.g., a dual-frequency RFID tag) that is capable of communicating with signals of a first frequency (e.g., a range of frequencies) and signals of a second frequency (e.g., another range of frequencies) to facilitate the techniques disclosed herein. While certain examples provided herein include multiple types of RFID readers 16, 18 and RFID tags 34, 36 to facilitate discussion of various components that may be utilized in the interactive system 10, it should be understood that the wearable device 14 may include only one RFID tag (e.g., only the first RFID tag 34 or only the second RFID tag 36), and the reader system 12 may include only one type of RFID reader (e.g., only one or more first RFID readers 16 configured to emit electromagnetic radiation at one frequency range or only one or more second RFID reader 18 configured to emit electromagnetic radiation at one frequency range). Such configurations may cause illumination of the LEDs 54 as the user travels through the attraction to facilitate tracking and/or feedback, and/or such configurations may enable tracking using the sensor 56.

Figure 2:
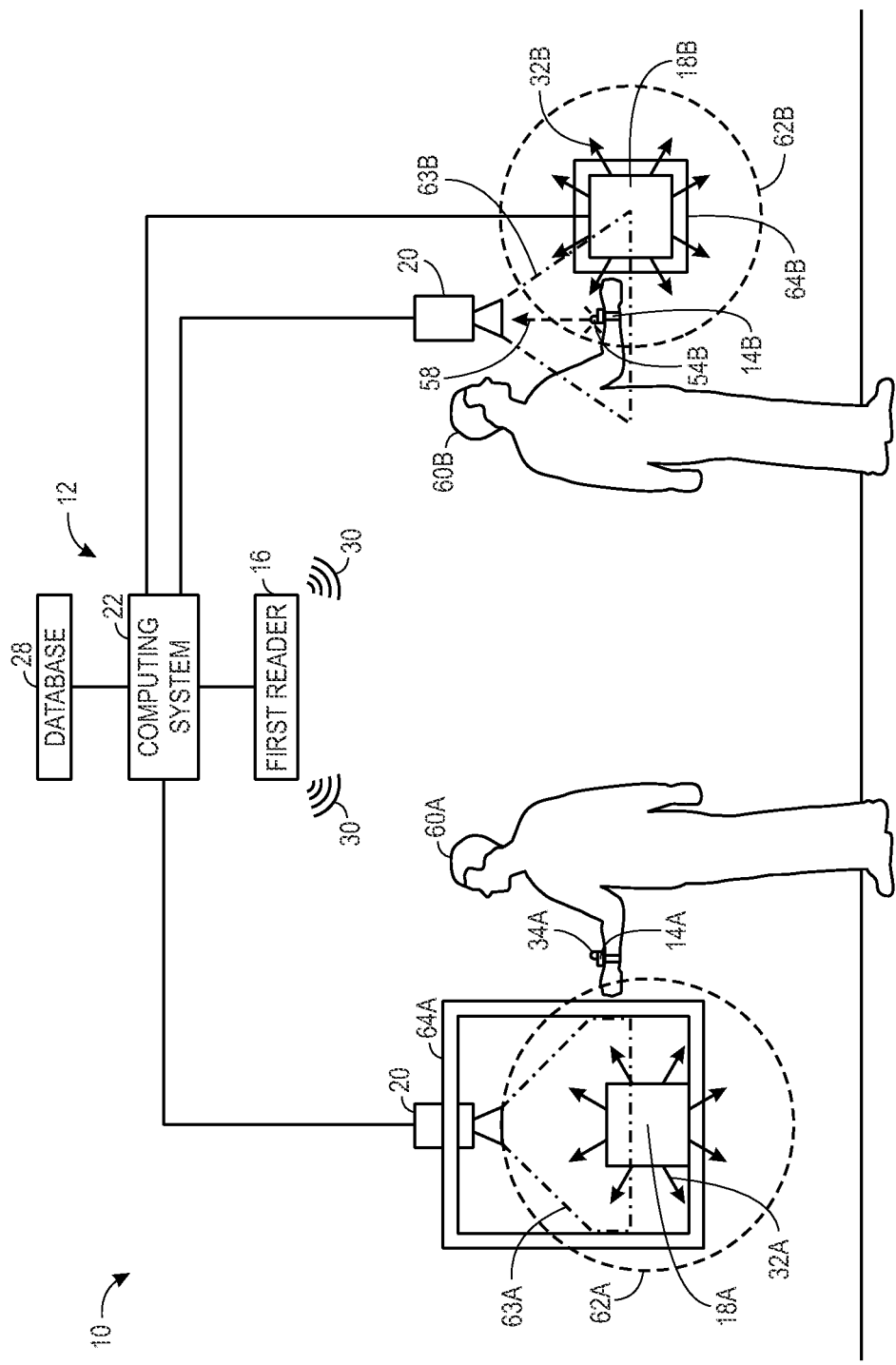
FIG. 2 is an illustration showing communication between a reader system and multiple wearable devices that may be used in the interactive system of FIG. 1, in accordance with an embodiment of the present disclosure.

FIG. 2 illustrates a first user 60a wearing a first wearable device 14a, and a second user 60b wearing a second wearable device 14b. The illustrated portion of the interactive system 10 includes two second readers 18a, 18b, the first reader 16, and the detectors 20, which are all communicatively coupled to the computing system 22. As shown, the first reader 16 transmits signals 30 receivable by the wearable devices 14a, 14b worn by the users 60a, 60b. Each second reader 18a, 18b transmits signals 32a, 32b within respective areas 62a, 62b.

In one embodiment, the second readers 18a, 18b have a relatively short communication range, and thus, communicate with the wearable devices 14a, 14b when the users 60a, 60b make physical contact with targets 64a, 64b proximate to the second readers 18a, 18b or when the wearable devices 14a, 14b are otherwise brought within the areas 62a, 62b. Further, the first reader 16 has a relatively long communication range, and thus, continuously communicates with the wearable devices 14a, 14b through electromagnetic radiation.

Successful communication between the wearable devices 14a, 14b and the second readers 18a, 18b may result in illumination of the one or more LEDs 54a, 54b of the wearable devices 14a, 14b. Upon illumination of the LEDs 54a, 54b of the wearable devices 14a, 14b, the detectors 20 provide verification that a correct or desired interaction between the wearable devices 14a, 14b and second readers 18a, 18b (or between the user and a particular target 64) has occurred. In one embodiment, verification may include determining which user 60a, 60b has interacted with the second reader 18a, 18b. For example, characteristics of the illumination of the LED(s) 54a, 54b of the wearable devices 14a, 14b may be unique to each wearable device 14a, 14b. For example, the LED(s) 54a of the first wearable device 14a may be of one color, while the LED(s) 54b of the second wearable device 14b may be of another color. Further, the LED(s) 54 of the wearable devices 14a, 14b may blink at unique rates or have various other differentiating characteristics detectable by the detectors 20, and thus, the processor 26 of the computing system 22 may determine or receive an additional input indicative of which wearable device 14a, 14b is proximate to the target 64a, 64b.

More particularly, the first user 60a wearing the wearable device 14a with one or more LEDs 54a is positioned near the target 64a. As discussed above, the wearable device 14a receives signals 30 from the first reader 16. As such, the components of the wearable device 14a are powered and/or the computing system 22 may determine that the first user 60a is in the general vicinity of the target 64a. However, as illustrated, the wearable device 14a of the first user 60a is not within the area 62a of the second reader 18a. Thus, the wearable device 14a is not in communication with second reader 18a. However, upon the first user 60a positioning the wearable device 14a within the area 62a, the wearable device 14a is in communication with the second reader 18a, and in one embodiment, one or more of the LEDs 54a may be illuminated to facilitate tracking and/or to provide a feedback response. For example, as illustrated, the detector 20 is positioned proximate to the target 64a and the second reader 18a. As such, the detector 20 may detect the light emitted by the one or more LEDs 54a (e.g., the light emitted to due to the interaction between the second RFID tag 36 [FIG. 1] of the wearable device 14a and the second reader 18a), while the wearable device 14 is properly positioned relative to the target 64a and within the area 62a proximate to the second reader 18a.

Upon receipt of a signal from the second reader 18a indicating that an interaction with the second RFID tag 36 (FIG. 1) of the wearable device 14a occurred (which may also include identification information transferred from the second RFID tag 36 [FIG. 1] from the wearable device 14a) and receipt of a signal from the detector 20 indicating that light from the one or more LEDs 54a was detected and/or has characteristics that correspond to the expected characteristics of the light that should be emitted by the one or more LEDs 54a of the wearable device 14a, the computing system 22 will update the database 28 with information based on the interaction between the first user 60a and the target 64a (e.g., assign points). In one embodiment, the computing system 22 may determine whether the wearable device 14a was in motion during the interaction between the wearable device 14a and the second reader 18a based on the signal received from the detector 20 (e.g., the detector 20 may include imaging sensors or camera or other types of detectors capable of detecting movement of the light emitted by the one or more LEDs 54a).

As shown, the wearable device 14b of the second user 60b is within the area 62b containing signals 32b emitted by the second reader 18b. As such, the wearable device 14b and the second reader 18b are in communication, and the one or more LEDs 54b of the wearable device 14b are emitting light 58 that is detectable by the detector 20. Upon receipt of a signal from the second reader 18b indicating that an interaction with the second RFID tag 36 (FIG. 1) occurred (which may also include identification information transferred from the second RFID tag 36 from the wearable device 14b) and receipt of a signal from the detector 20 indicating that light from the LED 54b was detected and/or has characteristics that correspond to the expected characteristics of the light that should be emitted by the LED 54b of the wearable device 14b, the computing system 22 updates the database 28 with information based on the interaction between the second user 60b and the target 64b (e.g., assign points). In one embodiment, the computing system 22 may determine whether the wearable device 14b was in motion during the interaction between the wearable device 14b and the second reader 18b based on the signal received from the detector 20 (e.g., the detector 20 may include imaging sensors or cameras or other types of detectors capable of detecting movement of the light emitted by the one or more LEDs 54b).

As noted above, in one embodiment, the LEDs 54 may emit visible light of one or more frequencies to enable tracking and also to provide feedback to the user. However, in one embodiment, the LEDs 54 may emit invisible light (e.g., infrared) to enable detecting the LEDs 54 with the detector 20, while also limiting potential distractions to the user as the user travels through the attraction or participates in the game, for example. It should be appreciated that the one or more LED's 54 of the wearable devices 14 may be illuminated in response to receipt of the signals 30 from the first reader 16. In such cases, the detector 20 may detect the emitted light, which may have particular characteristics that enable the computing system 22 to determine the identity of the user and to properly assign points. The signal from the detector 20 may be considered in combination with the identification information transmitted from the first RFID tag 34 [FIG. 1] to the first reader 16 to facilitate determination of the identity of the user and proper assignment of points. Thus, in some cases, the interactive system 10 may operate without the second readers 18.

It should also be appreciated that, in one embodiment, the wearable device 14 may contain a light detector, and the illustrated detector 20 may, instead, be a light emitter. In such cases, the microprocessor 38 may write to the memory 48 of one or more of the RFID tags 34, 36 with information indicative of detection of light emitted by the light emitter at the detector of the wearable device 14. In one embodiment, the detector of the wearable device 14 may be configured to detect darkness, resulting in the microprocessor 38 writing to the memory 48 of the RFID tags based on determining that a light level is below a threshold. The data may be transferred from the memory 48 to of the RFID readers 16, 18 and may be used by the computing system 22 to confirm a successful interaction (e.g., the user properly positioned the wearable device 14 in a dark area).

Figure 3:
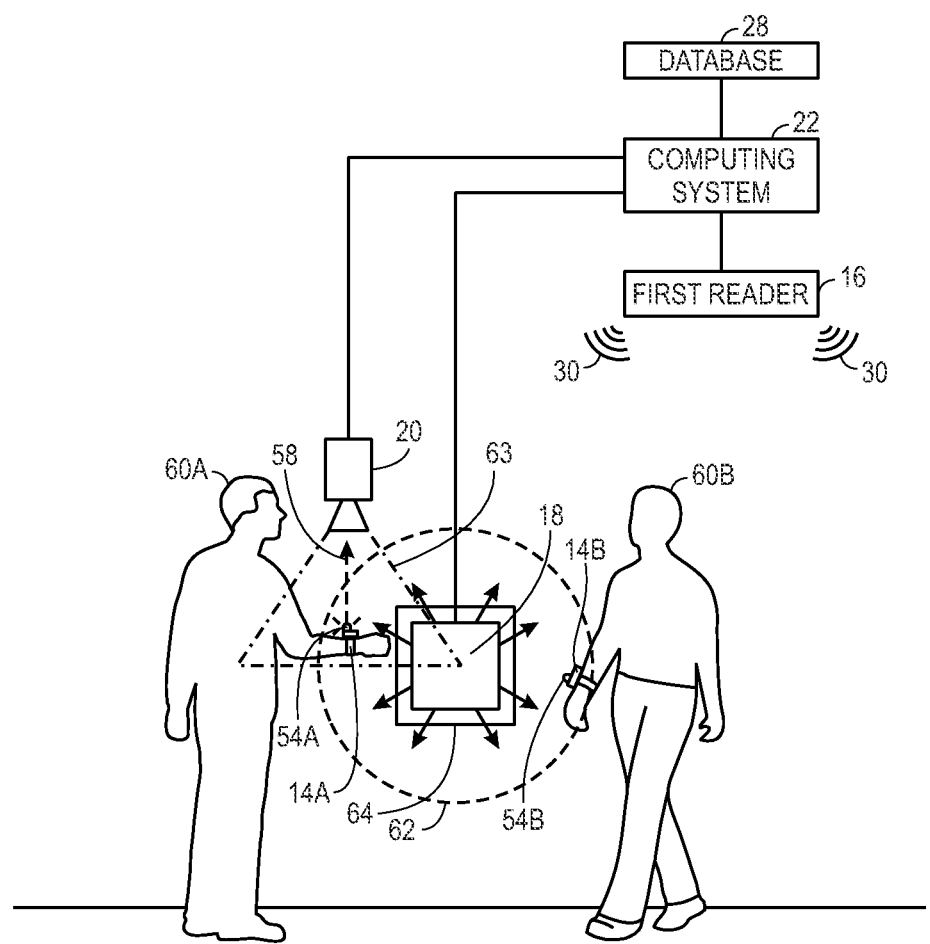
FIG. 3 is an illustration showing communication between a reader system and multiple wearable devices proximate to one target that may be used in the interactive system of FIG. 1, in accordance with an embodiment of the present disclosure.

FIG. 3 illustrates the first user 60a, the second user 60b, the detector 20, the first reader 16, and the second reader 18. The first reader 16, the second reader 18, and the detector 20 are communicatively coupled to the computing system 22, as discussed above. The second reader 18 is emitting signals 32 within the area 62. The first user 60a is wearing the wearable device 14a having the one or more LEDs 54a and the second user 60b is wearing the wearable device 14b having the one or more LEDs 54b. As illustrated, the detector 20 detects light within a range 63, which may partially overlap with the area 62 associated with the range of signals 32 from the second reader 18.

As illustrated, both wearable devices 14a, 14b are within the area 62 associated with the range of signals 32 from the second reader 18 disposed proximate to the target 64. As such, both wearable devices 14a, 14b are in communication with the second reader 18. However, as illustrated, the wearable device 14a worn by the first user 60a is also within the range 63 associated with the detector 20. The one or more LEDs 54a of wearable device 14a may have a different characteristic illumination than the one or more LEDs 54b of wearable device 14b (e.g., the one or more LEDs 54a may emit red light and the one or more LEDs 54b may emit blue light). In the illustrated example, the detector 20 may only detect the light from the one or more LEDs 54a of the wearable device 14a worn by the first user 60a. Therefore, the computing system 22 may determine that the first user 60a is interacting differently with second reader 18 (and the target 64) than the second user 60b. In one embodiment, the computing system 22 may make a determination to award users 60a, 60b based on the communication between the wearable devices 14a, 14b and the second reader 18, in combination with whether the detector 20 observes the one or more LEDs 54 (e.g., 54a and/or 54b). For example, in the illustrated example, the computing system 22 may only award points to the first user 60a because the detector 20 detected the light emitted by the one or more LEDs 54a of the wearable device 14a carried by the first user 60a while the wearable device 14a is within the range 62 of the second reader 18.

As noted above, in one embodiment, the interactive system 10 may only include one reader (e.g., either the first reader 16 or the second reader 18) and the corresponding RFID tag (e.g., either the first RFID tag 34 or the second RFID tag 36). For example, if the illustrated interactive system 10 includes only the first reader 16 and the first RFID tag 34, the one or more LEDs 54 of the respective wearable devices 14 may continuously emit light while the wearable device 14 communicates with the first reader 16. As such, the computing system 22 may award points to the user when the detector 20 detects the light emitted from the one or more LEDs 54 of the wearable device 14.

Figure 4:
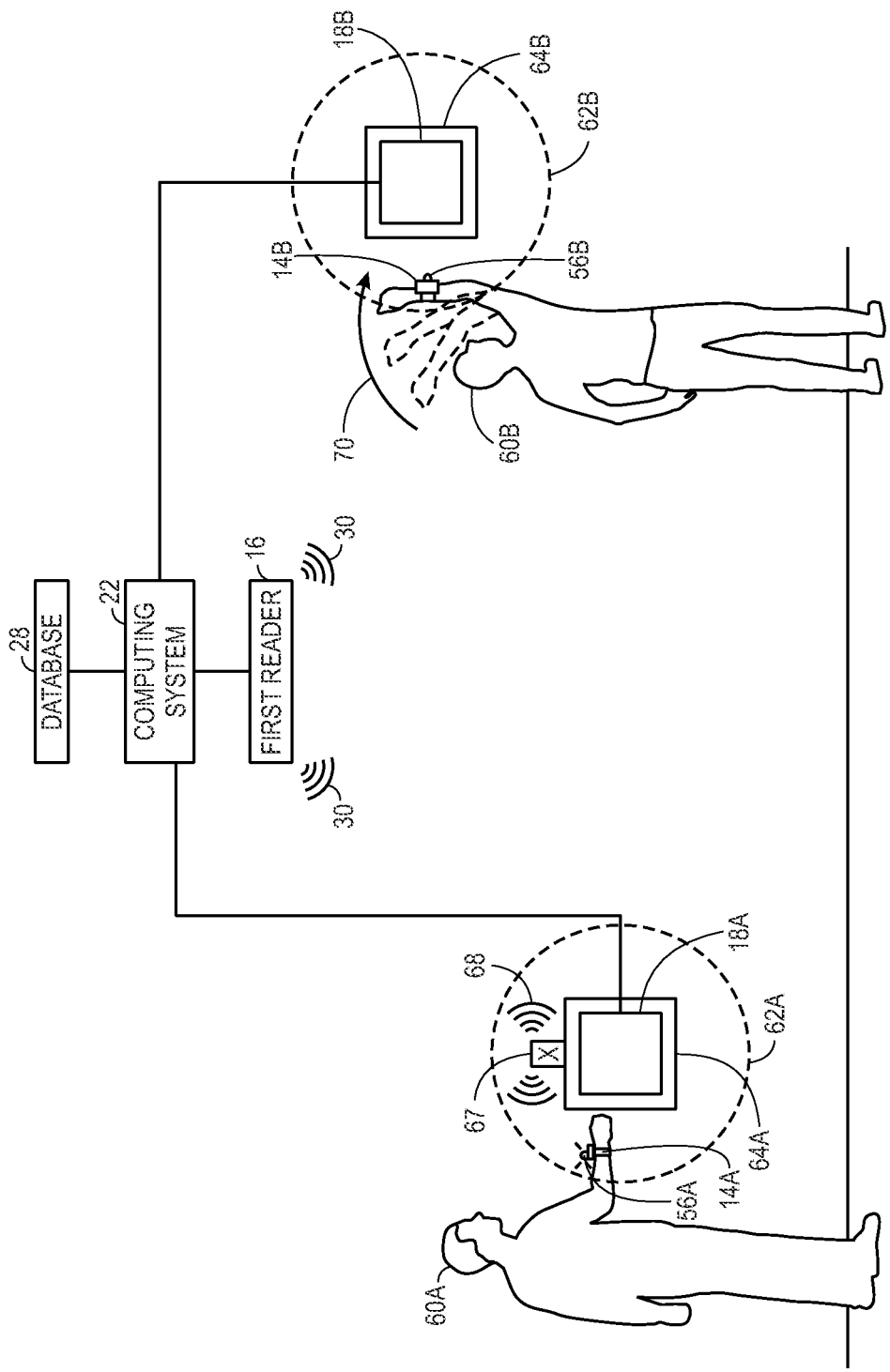
FIG. 4 is an illustration showing communication between a reader system and multiple wearable devices having sensors that may be used in the interactive system of FIG. 1, in accordance with an embodiment of the present disclosure.

FIG. 4 illustrates the first user 60a, the second user 60b, the second readers 18a, 18b, and the first reader 16. The first reader 16 and the second readers 18a, 18b are communicatively coupled to the computing system 22. The second reader 18a is emitting signals 32a within the area 62a. The second reader 18b is emitting signals 32b within the area 62b. As illustrated, an output device 67 (e.g., speaker, light emitter) that provides an output 68 (e.g., sound, light) may be positioned proximate to the target 64a.

Both the wearable device 14a of the first user 60a and the wearable device 14b of the second user 60b are in communication with the first reader 16 (e.g., receive signals 30 from the first reader 16), and thus, may be powered and may provide identification (e.g., via backscatter) to the first reader 16. The wearable device 14a of the first user 60a is also in communication with the second reader 18a (e.g., is within the area 62a and is receiving signals 32a). In one embodiment, the sensor 56a of the wearable device 14a may be configured to detect sound, and the output device 67 may be configured to provide sound as the output 68. Thus, when the sensor 56a detects the output 68, the microcontroller 38 of the wearable device 14a may write data indicative of this detection to the memory 48 of the wearable device 14a. Then, the antenna 46 of the wearable device 14a may backscatter the data to the first reader 16 or the second reader 18a. The computing system 22 may determine that points should be awarded to the first user 60a based on the wearable device 14a being in communication with the second reader 18a and also detecting the output 68. It should be appreciated that the output device 67 may additionally or alternatively include a light emitter that emits light, and the wearable device 14a may include a light detector that is configured to detect the light emitted by the emitter to facilitate tracking of the wearable device 14a.

The sensor 56b of the wearable device 14b worn by the second user 60b may be a motion sensor, such as a gyroscope or accelerometer, that detects the motion or position of the wearable device 14b. When the second user 60b moves (e.g., illustrated by arrow 70) the wearable device 14b into the area 62b, the wearable device 14b is in communication with the second reader 18b. In one embodiment, the sensor 56b may also detect the motion or orientation of the wearable device 14b prior to or while the wearable device 14b is in communication with the second reader 18b. For example, the sensor 56b may only be operated to sense the condition of the wearable device 14 when the wearable device 14 communicates with the second reader 18b. In one embodiment, the sensor 56b may be operated at other periods of time (e.g., whenever sufficient power is provided, such as via communication between the wearable device 14b and the first reader 16). In some such cases, only data obtained when the wearable device 14b communicates with the second reader 18b may be written to the memory 48 of the one or more RFID tags 34, 36 and/or transferred via backscatter to the computing system 22. In some such cases, only data obtained during a certain time period (e.g., approximately 1, 2, 3, 4, 5 or more seconds prior to an initial communication between the wearable device 14b and the second reader 18b) may be written to the memory 48 of the one or more RFID tags 34, 36 and/or transferred via backscatter to the computing system 22. In some such cases, only data indicative of motion may be written to the memory 48 of the one or more RFID tags 34, 36 and/or transferred via backscatter to the computing system 22.

More particularly, the data measured by the sensor 56b is written to the respective memory 48 of the one or more of the RFID tags 34, 36. Then, the data is backscattered to the respective reader 16, 18b, and the computing system 22 may make a determination to award points based on the data indicative of the gesture performed by the second user 60b. As discussed above, in one embodiment, the interactive system 10 may only include type of reader (e.g., one or more first readers 16 or one or more second readers 18b), and the sensor 56 may operate to monitor the condition of the wearable device 14 in a similar manner.

Figure 5:
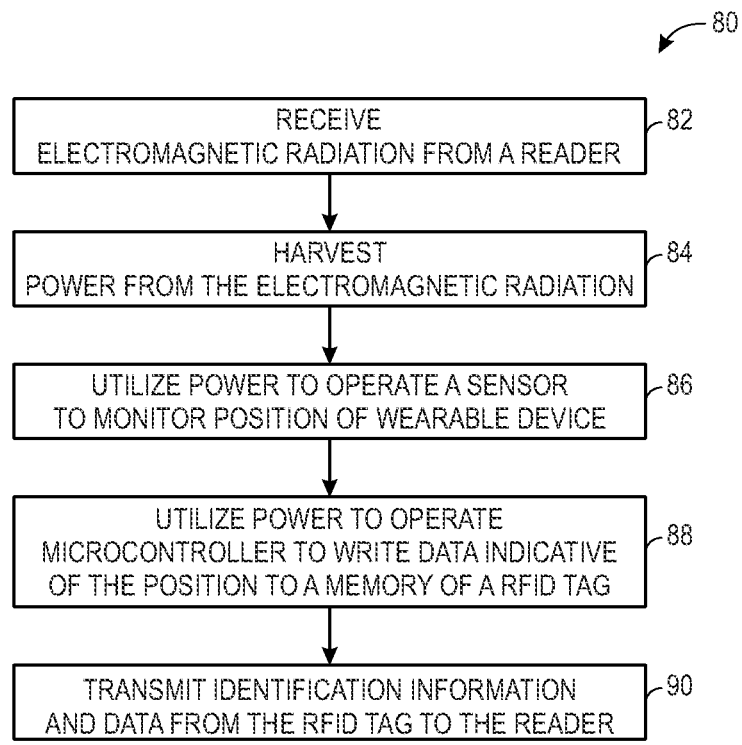
FIG. 5 is a flow diagram of a method of operating a wearable device having a sensor that may be used in the interactive system of FIG. 1, in accordance with an embodiment of the present disclosure.

FIG. 5 is a flow diagram illustrating one embodiment of a process 80 for operating the wearable device 14 that includes the sensor 56, in accordance with present techniques. It is to be understood that the steps discussed herein are merely exemplary, and certain steps may be omitted or added, and the steps may be performed in a different order. In one embodiment, the process 80 may be executed by the first RFID tag 34 and/or the second RFID tag 36 in cooperation with the microcontroller 38 and the other components of the wearable device 14.

The process 80 begins with the antenna 46 of the first RFID tag 34 and/or the second RFID tag 36 receiving electromagnetic radiation from a respective first reader 16 or second reader 18 (block 82). As discussed above, after the antenna 46 receives electromagnetic radiation, the antenna 46 may return a backscatter with information stored within the memory 48 of the RFID tag 34, 36 to the respective reader 16, 18. In one embodiment, this information may include an identification number that is specific to the wearable device 14, and thus, identifies a user (e.g., user using the wearable device 14). In one embodiment, the electromagnetic radiation emitted by the first reader 16 travels a relatively long distance, and the electromagnetic radiation emitted by the second reader 18 travels a relatively short distance. The first RFID tag 34 is capable of communicating with the first reader 16, and the second RFID tag 36 is capable of communicating with the second reader 18.

Once the wearable device 14 has received electromagnetic radiation, the wearable device 14 harvests power (block 84) from the electromagnetic radiation. As discussed above, the first RFID tag 34 and the second RFID tag 36 may each include an integrated circuit 52 that powers the microchip 50. Additionally, the integrated circuit 52 powers the power circuitry 42, which provides power to the microcontroller 38 (block 86) and other components of the wearable device 14 (e.g., the sensor 56). In one embodiment, the power circuitry 36 may include a capacitor or battery that is electrically coupled to a receiver coil and that stores power upon the wearable device 14 receiving signals from the first reader 16 and/or the second reader 18.

Once the microcontroller 38 is powered, the microcontroller 38 may then output a signal (e.g., control signal) to power the sensor 56 of the wearable device 14 (block 86). Once the sensor 56 is powered, it may measure or determine information indicative of a condition of the wearable device 14. For example, when the sensor 56 is an accelerometer, the sensor 56 might detect motion of the wearable device 14. The sensor 56 may transmit information to the microcontroller 38 indicative of the detected motion or position of the wearable device 14.

Then, microcontroller 38 utilizes the power to write data indicative of the position or movement of the wearable device 14 to the memory 48 of an RFID tag (e.g., first RFID tag 34 and/or second RFID tag 36) (block 88). In one embodiment, an accelerometer may detect a motion of or a force applied to the wearable device 14 for an amount of time. For example, the motion or the force may be associated with a user hitting the target 64, as discussed above. The associated information is then written as data to the memory 48 of the RFID tags 34 and/or 36. The data written to the memory 48 of the RFID tags 34 and/or 36 is transmitted (e.g., through backscatter) to the one or more readers (e.g., first reader 16 and/or second reader 18). Then, the computing system 22 process the information and may update the database 28 and/or award points based at least in part on the information measured by the sensor 56b. In one embodiment, the data may be indicative of a sensor 56 receiving sound or light waves. As such, the data would be indicative of the wearable device 14 being in an area where the wearable device 14 could receive such waves. For example, an attraction of an amusement park may include multiple light emitters that emit light. Thus, data indicative of the sensor 56 detecting the light is indicative of the position of the user within the attraction.

Once the data indicative of the position or movement of the wearable device 14 is written to the memory 48 of the RFID tag 34, 36, the wearable device 14 may transmit identification information and data from the RFID tag to the reader 16, 18 (block 90). As discussed above, the antenna 46 of the RFID tag 34, 36 may communicate with the reader 16, 18 by backscatter. In one embodiment, when the wearable device 14 is communicating with the reader system 12 (e.g., the RFID tags 34, 36 are receiving signals 30, 32 from the reader 16, 18), the antenna 46 of the RFID tags 34, 36 may continuously backscatter data indicative of the position or movement of the wearable device 14. As such, the computing system 22 may award points to a user once the data is above a certain threshold (e.g., the data from an accelerometer indicates that a user made an intentional motion, such as a wave or a jab), for example.

Figure 6:
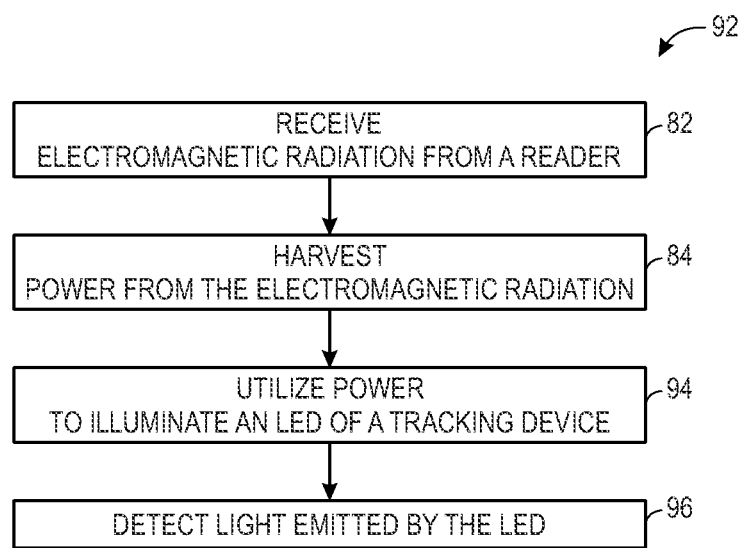
FIG. 6 is a flow diagram of a method of operating a wearable device having a light emitter that may be used in the interactive system of FIG. 1, in accordance with an embodiment of the present disclosure.

As discussed above, the wearable device 14 may additionally or alternatively include one or more LEDs 54 that operate as the tracking device 40. FIG. 6 is a flow diagram illustrating of one embodiment of a process 92 for operating the wearable device 14 that includes the one or more LEDs 54, in accordance with present techniques. It is to be understood that the steps discussed herein are merely exemplary, and certain steps may be omitted or added, and the steps may be performed in a different order. In one embodiment, some steps of the process 92 may be executed by the first RFID tag 34 and/or the second RFID tag 36 in cooperation with the microcontroller 38 and the other components of the wearable device 14. Additionally, some steps of the process 92 may be carried out by the detector 20 that is communicatively coupled to the computing system 22.

The process 92 begins with the antenna 46 of the first RFID tag 34 and/or the second RFID tag 36 receiving electromagnetic radiation from a respective first reader 16 or second reader 18 (block 82). As discussed above, after the antenna 46 receives electromagnetic radiation, the antenna 46 may return a backscatter with information stored within the memory 48 of the RFID tag 34, 36 to the respective reader 16, 18. In one embodiment, this information may include an identification number that is specific to the wearable device 14, and thus, identifies a user (e.g., user using the wearable device 14). In one embodiment, the electromagnetic radiation emitted by the first reader 16 travels a relatively long distance, and the electromagnetic radiation emitted by the second reader 18 travels a relatively short distance. The first RFID tag 34 is capable of communicating with the first reader 16, and the second RFID tag 36 is capable of communicating with the second reader 18.

Once the wearable device 14 has received electromagnetic radiation, the wearable device 14 harvests power (block 84) from the electromagnetic radiation. As discussed above, the first RFID tag 34 and the second RFID tag 36 may each include an integrated circuit 52 that powers the microchip 50. Additionally, the integrated circuit 52 powers the power circuitry 42, which provides power to the microcontroller 38 and other components of the wearable device 14 (e.g., tracking device 40, such as the LED 54). In one embodiment, the power circuitry 36 may include a capacitor or battery that is electrically coupled to a receiver coil and that stores power upon the wearable device 14 receiving signals from the first reader 16 and/or the second reader 18.

Once the microcontroller 38 is powered, the microcontroller 38 then outputs a signal (e.g., control signal) to power one or more LED(s) 54 of the tracking device 40 (block 94). In one embodiment, the control signal is a variable voltage applied to one or more of the LEDs 54, which causes the LED to emit light intermittently at a particular rate.

Then, the detector 20 detects the light emitted by the one or more LEDs 54 (block 96). For example, the detector 20 may detect that the wearable device 14 worn by the user is in motion (e.g., the user is waving their hand or hitting the target) during the interaction or communication between the second reader 18 and the second RFID tag 36 of the wearable device 14. In one embodiment, the detector 20 may monitor a characteristic (e.g., color, blinking pattern) of the LED 54 of the tracking device 40. The characteristic of the LED(s) 54 may be associated with one wearable device 14 or a group of wearable devices 14. As such, when the detector 20 detects light, light indicative of motion, or light having the characteristic, the computing system 22 may award the user points based on a successful interaction indicated by both communication between the wearable device 14 and the second reader 18, and detection of the light emitted by LED 54 at the detector 20.

Accordingly, the present disclosure is directed to an interactive system having a reader system and a wearable device that utilize RFID to track a guest's interactions with interactive elements. More specifically, the reader system includes one or more readers that communicate (e.g., transmit and receive signals) with one or more tags of a wearable device through electromagnetic radiation. The readers continuously emit electromagnetic radiation within a range (e.g., communication range), and upon the wearable device entering that range, the readers communicate with the wearable device. The electromagnetic radiation that is received by the wearable device provides power to a tracking device. For example, the tracking device may include LEDs that emit light that is detected by a detector. In one embodiment, a computing system is communicatively coupled to the detector and determines or confirms the identification of a user based on a characteristic of the LED that may be specific to the wearable device (e.g., the LED of one wearable device may emit a red light, while the LED of another wearable device 14 emit blue light). In one embodiment, the computing system may award points to a user, or otherwise update a user profile of the user, based at least in part on the detected light. In one embodiment, the tracking device may be a sensor configured to detect a condition, such as a position or movement, of the wearable device. The movement may be indicative of a user performing an appropriate gesture (e.g., jabbing, jumping, dancing, waving, or other gestures) that may be expected or called for at a particular interactive element. The data obtained by the sensor may be stored on a memory of one or more RFID tags of the wearable device, and then transmitted (e.g., via backscatter) to the respective reader, which is communicatively coupled to the computing system. In one embodiment, the computing system may award points to a user, or otherwise update a user profile of the user, based at least in part on the condition detected by the sensor.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to FIGS. 1-6 may be combined in any suitable manner. For example, the wearable device 14 may include any suitable combination of sensors 56 and LEDs 54 to facilitate tracking of the wearable device 14.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A wearable device comprising:
a radio-frequency identification (RFID) tag that stores identification information;
one or more LEDs configured to facilitate detection of the wearable device by an external light detector; and
a microcontroller coupled to the RFID tag and the one or more LEDs and configured to control at least one LED of the one or more LEDs to emit light in response to receipt of electromagnetic radiation from a RFID reader at the RFID tag.

2. The wearable device of claim 1, comprising power circuitry configured to provide power to the one or more LEDs and the microcontroller.

3. The wearable device of claim 2, wherein the power circuitry comprises an energy storage device.

4. The wearable device of claim 1, wherein the microcontroller is configured to control the at least one LED of the one or more LEDs to emit the light intermittently at a particular rate.

5. The wearable device of claim 1, wherein the microcontroller is configured to control the at least one LED of the one or more LEDs to emit the light with one or more characteristics comprising a color, a rate, a pattern, or a combination thereof.

6. The wearable device of claim 1, wherein the at least one LED of the one or more LEDs is configured to emit infrared light.

7. The wearable device of claim 1, comprising one or more sensors configured to monitor a condition of the wearable device, wherein the microcontroller is coupled to the one or more sensors and is configured to write data indicative of the condition to a memory of the RFID tag, and the RFID tag is configured to transmit the identification information and the data to the RFID reader.

8. A system, comprising:
a wearable device comprising a radio-frequency identification (RFID) tag that stores identification information, wherein the RFID tag is configured to transmit the identification information to a RFID reader in response to receipt of electromagnetic radiation from the RFID reader;
a tracking device supported by the wearable device and configured to facilitate tracking a position of the wearable device; and
a processor configured to receive the identification information from the RFID reader and data indicative of the position of the wearable device, wherein the processor is configured to detect an interaction between the wearable device and an interactive element of an attraction based on the received identification information and the received data indicative of the position of the wearable device.

9. The system of claim 8, comprising a microcontroller supported by the wearable device and configured to receive the data indicative of the position of the wearable device from the tracking device and to write the data indicative of the position of the wearable device to a memory of the RFID tag, wherein the RFID tag is configured to transmit the data indicative of the position of the wearable device from the memory to the RFID reader.

10. The system of claim 9, wherein the tracking device comprises at least one of an accelerometer, a gyrometer, a pressure sensor, a sound sensor, and a light sensor.

11. The system of claim 8, wherein the processor is configured to analyze the received data indicative of the position of the wearable device to determine a gesture performed by a guest wearing the wearable device during the interaction.

12. The system of claim 11, wherein the processor is configured to update a database to award points to the guest in response to determining that the gesture performed by the guest corresponds to an appropriate gesture for the interactive element.

13. The system of claim 8, wherein the tracking device comprises one or more light emitting diodes (LEDs) configured to emit light, and the system comprises a light detector that is external to the wearable device and that is configured to detect the light emitted by the one or more LEDS to generate the data indicative of the position of the wearable device.

14. The system of claim 8, wherein the processor is configured to update a database by associating at least one point with the wearable device in response to the detection of the interaction between the wearable device and the interactive element.

15. The system of claim 8, comprising the interactive element that is associated with the RFID reader and a plurality of additional interactive elements that are each associated with a respective additional RFID reader, wherein the processor is configured to detect a plurality of additional interactions between the wearable device and the plurality of additional interactive elements, calculate a total number of interactions based on the interaction and the plurality additional interactions, and to associate points with the wearable device in a database based on the total number of interactions.

16. A system, comprising:
a wearable device comprising a radio-frequency identification (RFID) tag that stores identification information, wherein the RFID tag is configured to transmit the identification information to a RFID reader in response to receipt of electromagnetic radiation from the RFID reader;
one or more light emitting diodes (LEDs) supported by the wearable device and configured to facilitate tracking a position of the wearable device via an electronic device external to the wearable device;
the electronic device, wherein the electronic device comprises a light detector that is configured to detect light emitted by the one or more LEDs and to generate data indicative of the position of the wearable device; and
a processor coupled to the electronic device, wherein the processor is configured to:
receive the identification information from the RFID reader and the data indicative of the position of the wearable device from the electronic device;
detect an interaction between the wearable device and an interactive element of an attraction based on the received identification information and the received data indicative of the position of the wearable device; and
analyze the received data indicative of the position of the wearable device to determine a gesture performed by a guest wearing the wearable device during the interaction.

17. The system of claim 16, comprising a microcontroller supported by the wearable device and configured to control at least one LED of the one or more LEDs to emit the light.

18. The system of claim 16, wherein the processor is configured to update a database to award points to the guest in response to determining that the gesture was performed by the guest wearing the wearable device during the interaction.

19. The system of claim 16, wherein the electronic device is configured to generate the data that is indicative of one or more characteristics of the light emitted by the one or more LEDs, and the processor is configured to differentiate the wearable device from another wearable device based on the identification information from the RFID reader and the one or more characteristics of the light emitted by the one or more LEDs.

20. The system of claim 16, wherein the processor is configured to adjust the interactive element of the attraction in response to detection of the interaction between the wearable device and the interactive element.

* * * * *